(12) United States Patent
Dobson

(10) Patent No.: US 6,548,926 B2
(45) Date of Patent: Apr. 15, 2003

(54) LINEAR DISPLACEMENT ACTUATOR

(75) Inventor: Simon Blair Dobson, Folkestone (GB)

(73) Assignee: Meritor Light Vehicle Systems-France, Sully sur Loire (FR)

( * ) Notice: Subject to any disclaimer, the term of this patent is extended or adjusted under 35 U.S.C. 154(b) by 65 days.

(21) Appl. No.: 09/791,484

(22) Filed: Feb. 23, 2001

(65) Prior Publication Data

US 2001/0017497 A1 Aug. 30, 2001

(30) Foreign Application Priority Data

Feb. 25, 2000 (FR) .............................. 00 02416

(51) Int. Cl.[7] .............................. H02K 7/06; H02K 7/10
(52) U.S. Cl. .............................. 310/82; 310/12; 310/36; 310/323.17; 74/60
(58) Field of Search .......................... 310/12, 328, 26, 310/82, 323.17, 80; 74/60

(56) References Cited

U.S. PATENT DOCUMENTS

| | | | |
|---|---|---|---|
| 4,734,610 A | | 3/1988 | Okumura et al. |
| 4,757,223 A | | 7/1988 | Ueyama |
| 4,929,859 A | * | 5/1990 | Suzuki et al. ............... 310/328 |
| 4,954,735 A | * | 9/1990 | Parsons ....................... 310/82 |
| 5,270,595 A | * | 12/1993 | Wisner ....................... 310/12 |
| 5,387,835 A | * | 2/1995 | Tsukimoto et al. ..... 310/323.13 |
| 6,100,609 A | * | 8/2000 | Weber ......................... 310/12 |

FOREIGN PATENT DOCUMENTS

| | | | |
|---|---|---|---|
| JP | 62285679 | 12/1987 | |
| JP | 05236765 A | * 9/1993 | ............ H02N/2/00 |
| JP | 07274475 A | * 10/1995 | .......... H02K/41/02 |

* cited by examiner

*Primary Examiner*—Nestor Ramirez
*Assistant Examiner*—Heba Y. Elkassabgi
(74) *Attorney, Agent, or Firm*—Carlson, Gaskey & Olds, P.C.

(57) ABSTRACT

The subject of the invention is a linear displacement actuator which includes a male part and a female part. One part includes a screw thread and the other part includes at least one peripheral rib which collaborates with the screw thread. The inside diameter of the female part, increased by the depth of the screw thread, is greater than the outside diameter of the male part. The female part bears linear actuators arranged at right angles in a support and is free to be displaced axially with respect to the male part. The linear actuators place the female part in sinusoidal vibration in two perpendicular directions with an appropriate phase shift between the vibrations, and displaces, rotation-wise, the line of contact between the screw thread and the at least one peripheral rib. The screw thread and the peripheral rib remain motionless in terms of rotation and therefore bring about relative linear displacement of the female part and of the male part.

8 Claims, 2 Drawing Sheets

LINEAR DISPLACEMENT ACTUATOR

BACKGROUND OF THE INVENTION

The present invention relates to actuators and deals more particularly with linear displacement actuators.

Motors and actuators for controllers of windows and other components on motor vehicles require many rotating components involving reduction gearing in order to bring about an essentially or partially linear displacement of some other component such as a side window, a sunroof, part of a locking system, a light source, a door, or some other closure member.

Such devices entail a great many parts, are bulky, expensive and require a relatively large amount of energy because of the numerous areas of friction between the various parts.

Hence, there is a need for an improved linear displacement actuator.

SUMMARY OF THE INVENTION

The present invention relates generally to a linear displacement actuator which involves the use of a minimum number of parts.

The subject of the invention is a linear displacement actuator which includes a male part and a female part. One part includes a screw thread and the other part includes at least one peripheral rib which collaborates with the screw thread. The inside diameter of the female part, increased by the depth of the screw thread, is greater than the outside diameter of the male part. The female part bears linear actuators arranged at right angles in a support and is free to be displaced axially with respect to the male part. The linear actuators place the female part in sinusoidal vibration in two perpendicular directions with an appropriate phase shift between the vibrations, and displaces, rotation-wise, the line of contact between the screw thread and the at least one peripheral rib. The screw thread and the peripheral rib remain motionless in terms of rotation and therefore bring about relative linear displacement of the female part and of the male part.

In another embodiment of the invention, the male part is a shaft having an external screw thread and the female part comprises internal circular ribs and grooves.

In yet another embodiment, the male part is a shaft with an external screw thread and the female part is a nut with an internal tapped thread of the same pitch as the external screw thread of the shaft but with a different thread slope.

In yet another embodiment, the female part is placed in a cage-like support which is free in terms of axial displacement along the shaft, between the linear actuators and corresponding return springs, each return spring being diametrically opposite a linear actuator.

Finally, in yet another embodiment, the linear actuators are piezoelectric or magnetostrictive actuators, or are electromagnetic elements powered from a suitable energy source.

BRIEF DESCRIPTION OF THE DRAWINGS

The invention will be better understood upon reading the description which will follow given merely by way of example and made with reference to the appended drawings, in which.

DETAILED DESCRIPTION OF THE PREFERRED EMBODIMENT

The linear displacement of a linear displaced component 12 can be brought about by rotating a line of contact, but not the actual contacting components, about an axis, the displacement being obtained by a combination of purely linear movements. The linearly displaced component 12, shown schematically in FIGS. 1 and 2, can be a side window, a sunroof, part of a locking system, a light source, a door, or some other closure member.

An actuator 11 employing displacement of the aforementioned type uses no rotary parts to create a linear movement along a screw thread. The actuator 11 is characterized by a certain number of expanding and contracting elements which are arranged around a component of appropriate shape. The component has characteristics analogous to a screw thread and is associated with an externally threaded shaft. The component is set in movement on a circular path about the threaded shaft by appropriate phase modulation of the expansion and contraction of the elements.

In the preferred embodiment, the expanding and contracting elements comprise appropriate piezoelectric or magnetostrictive cells or alternatively electromagnetic elements powered from an appropriate energy source.

It is well known that a perpendicular combination of two sinusoidal waves can create a circular movement as has been demonstrated by Lissajou and others.

Figure 1:
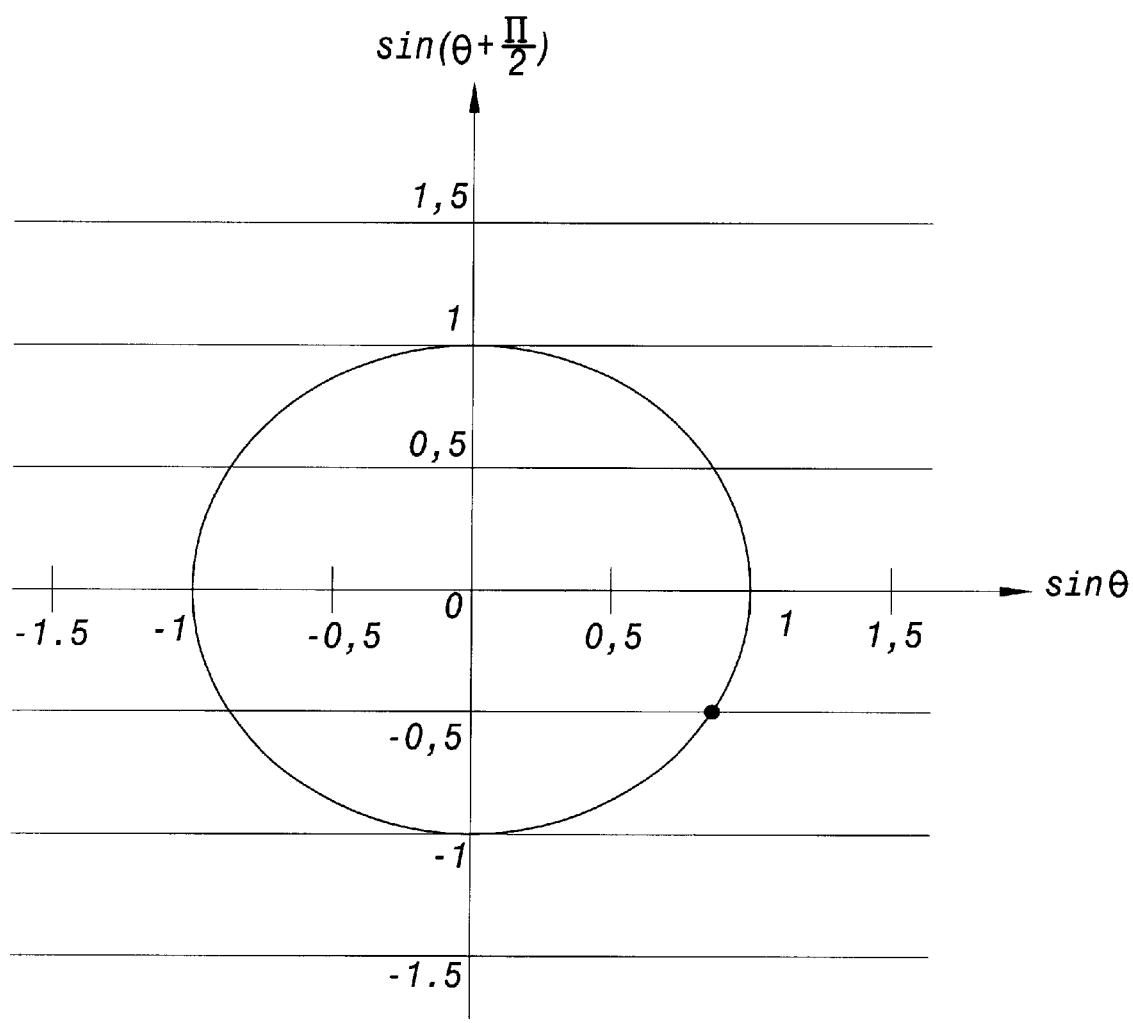
FIG. 1 is a graph showing the curve of displacement of a point on a circumference under the effect of two sinusoidal functions, the angles of which are offset by 90°.

An example of this is illustrated in the graph of FIG. 1 which is produced by determining the locus of a point such that $x=\sin\theta$ and $y=\sin(\theta+90°)$, the angle $\theta$ increasing from 0 to 360°. The point does not rotate itself, but travels in a circle.

Figure 2:
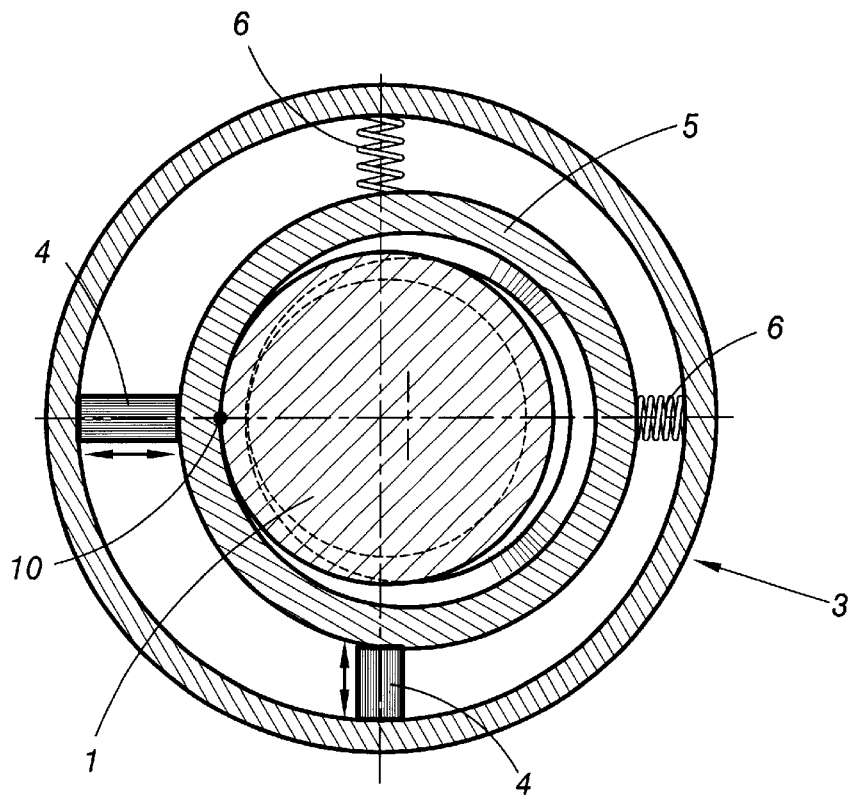
FIG. 2 is a section on 2—2 of the linear displacement actuator according to the invention and depicted in FIG. 3.
Figure 3:
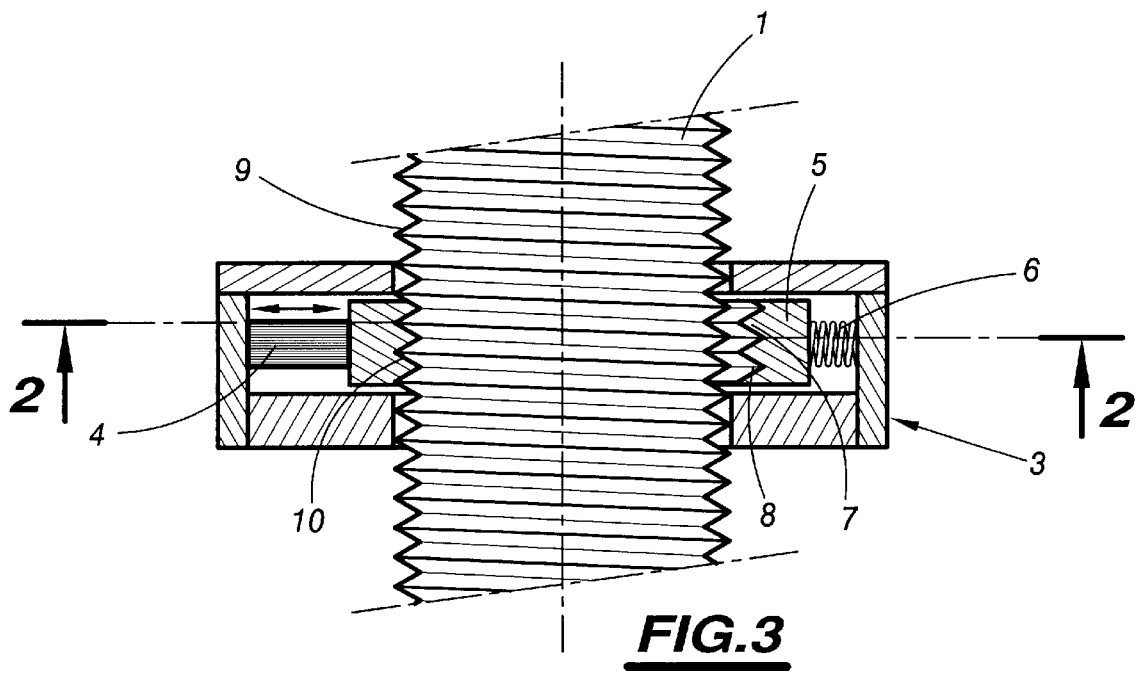
FIG. 3 is a schematic view in part section from above of the linear displacement actuator according to the invention.

The actuator 11 according to the invention and depicted in FIGS. 2 and 3 comprises a threaded shaft 1, (a male part). A cage-like support 3 which is axially free, and mounted on the shaft, comprises linear actuators 4 arranged at right angles with respect to the shaft 1 and which cause a nut 5, (a female part), to vibrate sinusoidally in two perpendicular directions with an appropriate phase shift between the vibrations, as depicted in FIG. 2. The nut 5 is placed in the support 3 between the linear actuators 4. Return springs 6 are diametrically opposite to each of the linear actuators 4. As can be seen in FIG. 3, the nut 5 has an inside diameter greater than the outside diameter of the threaded shaft 1. The nut has ribs 7 and adjacent corresponding grooves 8 which are circular, giving it zero slope.

The nut 5 is in contact, via its ribs 7 and its grooves 8, with the screw thread 9 of the threaded shaft 1 along a line of contact 10 because of the instantaneous application of the nut 5 to the shaft 1 under the combined action of the linear actuators 4 and of the corresponding return springs 6.

The urging of the nut 5 in two perpendicular directions by the actuators 4 with an appropriate phase shift causes the line of contact 10 to rotate about the shaft 1. The nut 5 itself does not rotate with respect to the shaft 1 even though the line of contact 10 does, as does the point in the aforementioned example with reference to FIG. 1.

The reversal of the phase shift between the two actuators 4 reverses the direction of travel of the nut 5 with respect to the shaft 1. It is fundamental to the principle of such an actuator 4 that, for each rotation of the line of contact 10, the nut 5 should advance by the difference in slope of the two threaded forms. Furthermore, the pitch of the two threaded forms must be equal if engagement of more than one thread is desired.

Advantageously, and as described above, the nut 5 has a zero thread slope and the shaft 1 has a slope equal to the chosen pitch as it is found in simple screw threads. In another embodiment, multiple screw threads can be utilized.

The device thus produced may be self-locking, that is to say irreversible, or not as desired, depending on the ratio of the diameters and of the slopes. The inside diameter of the nut 5 plus the depth of one thread has to be greater than the largest diameter of the shaft 1.

In an alternative embodiment, the roles of the nut 5 and the shaft 1 can be reversed to allow the screw thread of zero slope to be formed on the shaft 1 if this is more appropriate for manufacture.

The actuator thus formed may be used to drive essentially linear movements of various natures without having to resort to gearboxes and to complex power transmission devices.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A linear displacement actuator comprising:
   a male part having an outside diameter;
   a female part in which said male part is engaged having an inside diameter, said inside diameter of said female part being greater than said outside diameter of said male part;
   a screw thread on one of said parts;
   at least one peripheral rib on the other of said parts which collaborates with said screw thread; and
   at least a pair of linear actuators arranged perpendicularly in a support that is free to be displaced axially with respect to said male part and which places said female part in sinusoidal vibration in a pair of perpendicular directions with an appropriate phase shift between said vibrations, and displaces, rotation-wise, a line of contact between said screw thread and said at least one peripheral rib while said screw thread and said peripheral rib remain motionless in terms of rotation one with respect to each other to bring about relative linear displacement of said female part and said male part.

2. The actuator as recited in claim 1 wherein said male part is a shaft having said screw thread and said female part includes a plurality of internal circular ribs and a plurality of grooves.

3. The actuator as recited in claim 1 wherein said male part is a shaft having a screw thread and said female part is a nut having an internal tapped thread having a pitch equal to a pitch of said screw thread of said shaft, but having a thread slope different from a thread slope of said screw thread.

4. The actuator as recited in claim 1 wherein said linear actuators are piezoelectric.

5. The actuator as recited in claim 1 wherein said linear actuators are magnetostrictive actuators.

6. The actuator as recited in claim 1 wherein said linear actuators are electromagnetic elements powered from a suitable energy source.

7. A linear displacement actuator comprising:
   a shaft having an outside diameter and a screw thread;
   a female part in which said male part is engaged having an inside diameter and a plurality of internal circular ribs which collaborate with said screw thread and a plurality of grooves, said inside diameter of said female part being greater than said outside diameter of said male part; and
   at least a pair of linear actuators arranged perpendicularly in a cage-like support that is free to be displaced axially with respect to said male part and which places said female part in sinusoidal vibration in a pair of perpendicular directions with an appropriate phase shift between said vibrations, and displaces, rotation-wise, a line of contact between said screw thread and said at least one peripheral rib while said screw thread and said peripheral rib remain motionless in terms of rotation one with respect to each other to bring about relative linear displacement of said female part and said male part, and said female part is placed in said support which is free in terms of axial displacement along said shaft and is positioned between said linear actuators and a pair of corresponding return springs, each of said return springs being diametrically opposite of each of said linear actuator.

8. A controller for a component of a vehicle comprising:
   a linear displaced component; and
   an actuator to cause linear displacement of said component including a male part having an outside diameter, a female part in which said male part is engaged having an inside diameter, said inside diameter of said female part being greater than said outside diameter of said male part, a screw thread on one of said parts, at least one peripheral rib on the other of said parts which collaborates with said screw thread, and at least a pair of linear actuators arranged perpendicularly in a support that is free to be displaced axially with respect to said male part and which places said female part in sinusoidal vibration in a pair of perpendicular directions with an appropriate phase shift between said vibrations, and displaces, rotation-wise, a line of contact between said screw thread and said at least one peripheral rib while said screw thread and said peripheral rib remain motionless in terms of rotation one with respect to each other to bring about relative linear displacement of said female part and said male part.

* * * * *